(12) United States Patent
Evans

(10) Patent No.: US 7,221,461 B2
(45) Date of Patent: May 22, 2007

(54) METHOD AND APPARATUS FOR INTERFEROMETRIC MEASUREMENT OF COMPONENTS WITH LARGE ASPECT RATIOS

(75) Inventor: Christopher James Evans, Higganum, CT (US)

(73) Assignee: Zygo Corporation, Middlefield, CT (US)

( * ) Notice: Subject to any disclaimer, the term of this patent is extended or adjusted under 35 U.S.C. 154(b) by 1 day.

(21) Appl. No.: 11/201,859

(22) Filed: Aug. 11, 2005

(65) Prior Publication Data
US 2006/0033934 A1  Feb. 16, 2006

Related U.S. Application Data

(60) Provisional application No. 60/601,298, filed on Aug. 13, 2004.

(51) Int. Cl.
*G01B 11/02* (2006.01)
(52) U.S. Cl. ..................................................... 356/511
(58) Field of Classification Search ................ 356/511, 356/512, 513, 514, 515
See application file for complete search history.

(56) References Cited

U.S. PATENT DOCUMENTS 5,960,379 A * 9/1999 Shimizu et al. ............ 702/155
6,611,791 B1 * 8/2003 Kase et al. ................. 702/167
6,822,745 B2   11/2004 De Groot et al.
6,956,657 B2 * 10/2005 Golini et al. ............... 356/512
2001/0043333 A1  11/2001 Groot et al.
2003/0117632 A1   6/2003 Golini et al.

OTHER PUBLICATIONS

Evans, Christopher J., "Self-calibration: reversal, redundancy, error separation, and "absolute testing"", CIRP Annals, vol. 45/2 (1996), pp. 617-634.
Bray, M., "Stitching interferometer for large plano optics using a standard interferometer", Proc SPIE vol. 3134 (1997), pp. 39-50.
Griesmann U., et al., "Measuring Form and Radius of Spheres with Interferometry", CIRP Annals, vol. 53/1 (2004), pp. 451-454.
Assoufid, L., et al., "3-D surface profile measurements of large x-ray synchrotron radiation mirrors using stitching interferometry", Proc. SPIE vol. 4782 (2002), p. 21-28.

* cited by examiner

*Primary Examiner*—Gregory J. Tootley, Jr.
*Assistant Examiner*—Michael A. Lyons
(74) *Attorney, Agent, or Firm*—Francis J. Caufield

(57) ABSTRACT

Methods and apparatus that combine the techniques of reversal (or self-calibration) to provide a low spatial frequency measurement of a part shape, independent of systematic errors in the staging used to move the part and small aperture interferometry to provide high spatial frequency information on a large part. The low spatial frequency is used to establish the rigid body motions (e.g., tip, tilt, and piston for a plano object) to be applied to the individual sub-apertures of interferometric data in stitching them together to give a full map at high resolution of the whole part. No overlap between sub-apertures is required.

20 Claims, 5 Drawing Sheets

MEASUREMENT 1

MEASUREMENT 2

METHOD AND APPARATUS FOR INTERFEROMETRIC MEASUREMENT OF COMPONENTS WITH LARGE ASPECT RATIOS

CROSS REFERENCE TO RELATED APPLICATION

This application claims the benefit of priority from U.S. Provisional Patent Application No. 60/601,298 entitled METHOD AND APPARATUS FOR INTERFEROMETRIC MEASUREMENT OF COMPONENTS WITH LARGE ASPECT RATIOS filed on Aug. 13, 2004 in the name of Christopher James Evans, the entire contents of which are incorporated herein by reference.

FIELD OF THE INVENTION

This invention in general relates to interferometric metrology and more particularly to interferometric apparatus and methods for measuring large surfaces having large aspect ratios, i.e., much larger than 1.

BACKGROUND OF THE INVENTION

This invention solves a basic problem in the metrology for high spatial resolution measurement of large structures with aspect ratios (or their equivalent) much larger than one. Typical applications might be the measurements of stick mirrors or the measurement of circular flatness of rings where the ring width is small compared to the ring diameter.

In the field of optics manufacturing, it has long been a problem to make accurate, high-resolution measurements of large flats. Similar problems arise for large convex spherical or aspheric optics, or spherical optics covering a very large included angle (for example hemispheres). Another common problem is measurement of optics with large slopes, for example aspheric optics used in astronomy, lithography etc.

One solution to this problem is sub-aperture stitching. FIG. 1 from United States Patent Publication No. 2003-0117632 published on Jun. 26, 2003 in the name of Golini, Donald, Forbes, Greg and Murphy, Paul; and entitled Method for self-calibrated sub-aperture stitching for surface figure measurement shows measurement of a large aperture optic (14) by measuring a number of overlapping sub-apertures (12) arranged in an appropriate pattern. Either the part or the interferometer is moved between measurements. This movement introduces errors so the data in the overlapping regions are matched mathematically to establish the relationship between the sub-apertures. As discussed in Assoufid (Lahsen Assoufid, Michael Bray, Jun Qian, Deming Shu, 3D surface profile measurements of large x-ray synchrotron radiation mirrors using stitching interferometry Proc. SPIE Vol. 4782, 2002, p. 21–28) and the references therein and Golini, et al. above, such procedures are subject to all the common errors of interferometry, plus some errors specific to stitching. Large-scale fluctuations result from the propagation of small errors in the individual measurements, which cause imperfections in the overlap region. Assoufid, et al. above point out that the propagation of errors that vary between sub-aperture measurements is reduced when there is a two-dimensional array of overlapping sub-apertures (as in FIG. 1). For the specific case of measuring a synchrotron mirror, they show the propagation of errors when a single line of sub-apertures were measured; in their case these errors were reduced by "double overlap".

In view of the prior art, it is a primary object of the present invention to provide a mathematically stable procedure and apparatus for interferometrically measuring parts having large aspect ratios.

It is yet another object of this invention to provide procedures and apparatus by which the surfaces of high aspect ratio parts may more precisely be measured using low resolution and high resolution measurements which in their mathematical treatment compensate for systematic errors in part staging while permitting combination of sub aperture interferometric measurements without the use of overlap.

Other objects of the invention will be obvious, in part, and others will appear, in part, in the following detailed description when read in connection with the accompanying drawings.

SUMMARY OF THE INVENTION

This invention relates to methods and apparatus for precisely measuring parts with high aspect ratios by combining the techniques of reversal (or self-calibration) to provide a low spatial frequency measurement of the part shape, independent of systematic errors in the staging used to move the part, with small aperture interferometry to provide high spatial frequency information on a large part.

The low spatial frequency is used to establish the rigid body motions (e.g., tip, tilt, and piston for a piano object) to be applied to the individual sub-apertures of interferometric data in stitching them together to give a full map at high resolution of the whole part. No overlap between sub-apertures is required.

In one aspect the invention relates to a method in which a part is mounted for movement relative to measurement sub-systems after which measurement data is acquired at low spatial resolution over the whole surface of the part with a first measurement sub-system, preferably with displacement interferometers or the like.

Measurement data at high spatial resolution is then acquired over sub-apertures of the part under test using a second interferometric measurement sub-system, preferably a Fizeau or Twyman-Green.

Afterwards, the data acquired by first and second sub-systems is operated on to separate the error motions due to mounting and moving the part relative to measurement sub-systems from the errors of the part and for using the low spatial frequency information from first measurement sub-system to define the orientations of high spatial frequency measurements from the second measurement sub-system.

In another aspect, the invention relates to measurement apparatus comprising a mechanical arrangement for mounting and moving a part relative to measurement sub-systems; a first measurement sub-system for acquiring measurement data at low spatial resolution over the whole surface of the part; a second interferometric measurement sub-system for acquiring measurement data at high spatial resolution over sub-apertures of the part under test; and a device programmed for operating on the data acquired by said first and second subsystems to separate the error motions of said mechanical arrangement used for mounting and moving the part relative to said measurement sub-systems from the errors of the part and for using the low spatial frequency information from said first measurement subsystem to define the orientations of said high spatial frequency measurements from the second measurement sub-system.

BRIEF DESCRIPTION OF THE DRAWINGS

The structure, operation, and methodology of the invention, together with other objects and advantages thereof, may best be understood by reading the detailed description in connection with the drawings in which each part has an assigned numeral or label that identifies it wherever it appears in the various drawings and wherein.

DETAILED DESCRIPTION

The invention relates to interferometric apparatus and procedures by which measurement errors introduced by the mechanical arrangement holding and moving a high aspect ratio part relative to a measurement subsystem can be separated from errors in the part per se.

Figure 1:
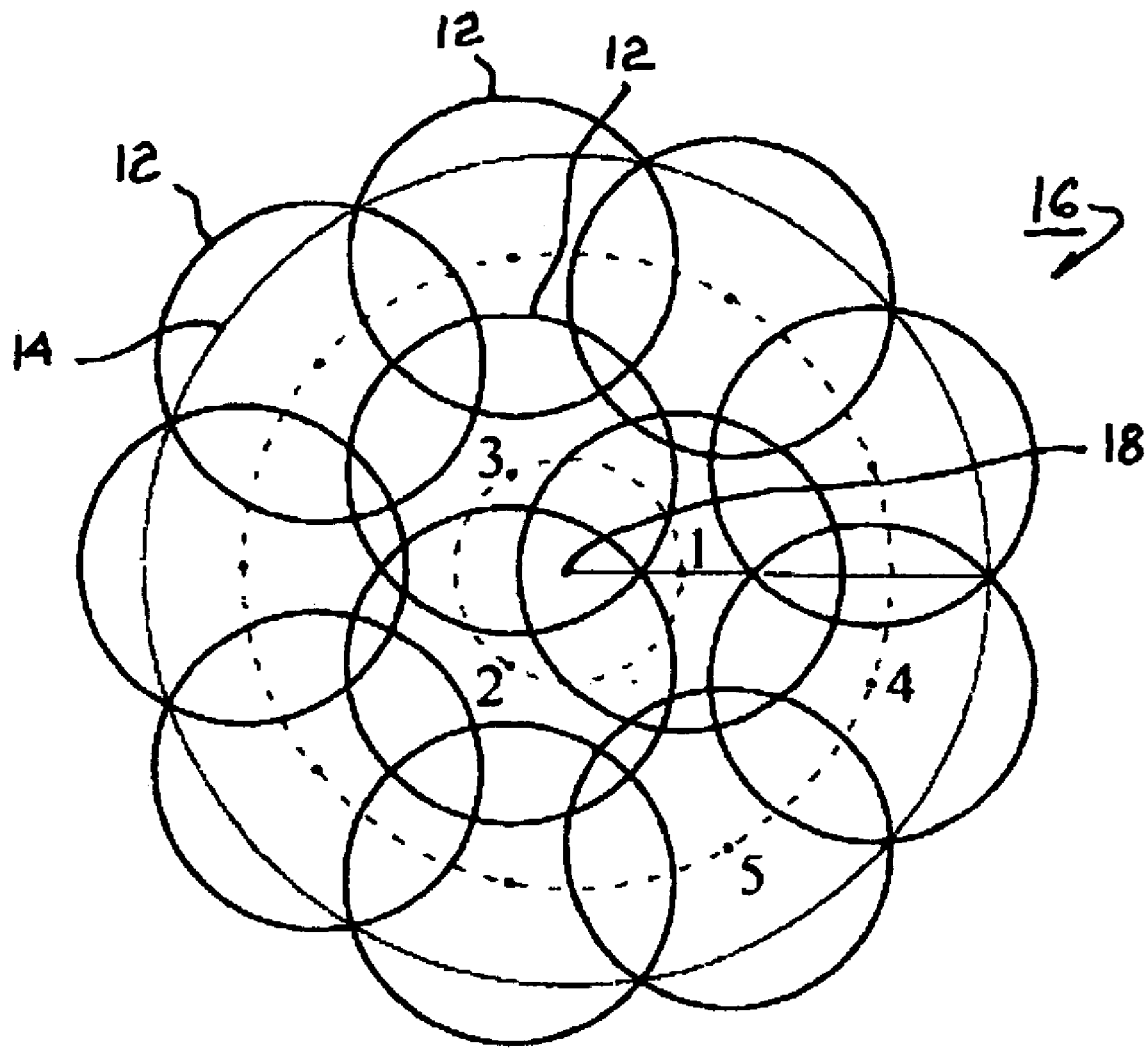
FIG. 1 illustrates a prior art technique employing sub-aperture stitching for measuring large surfaces.
Figure 2:
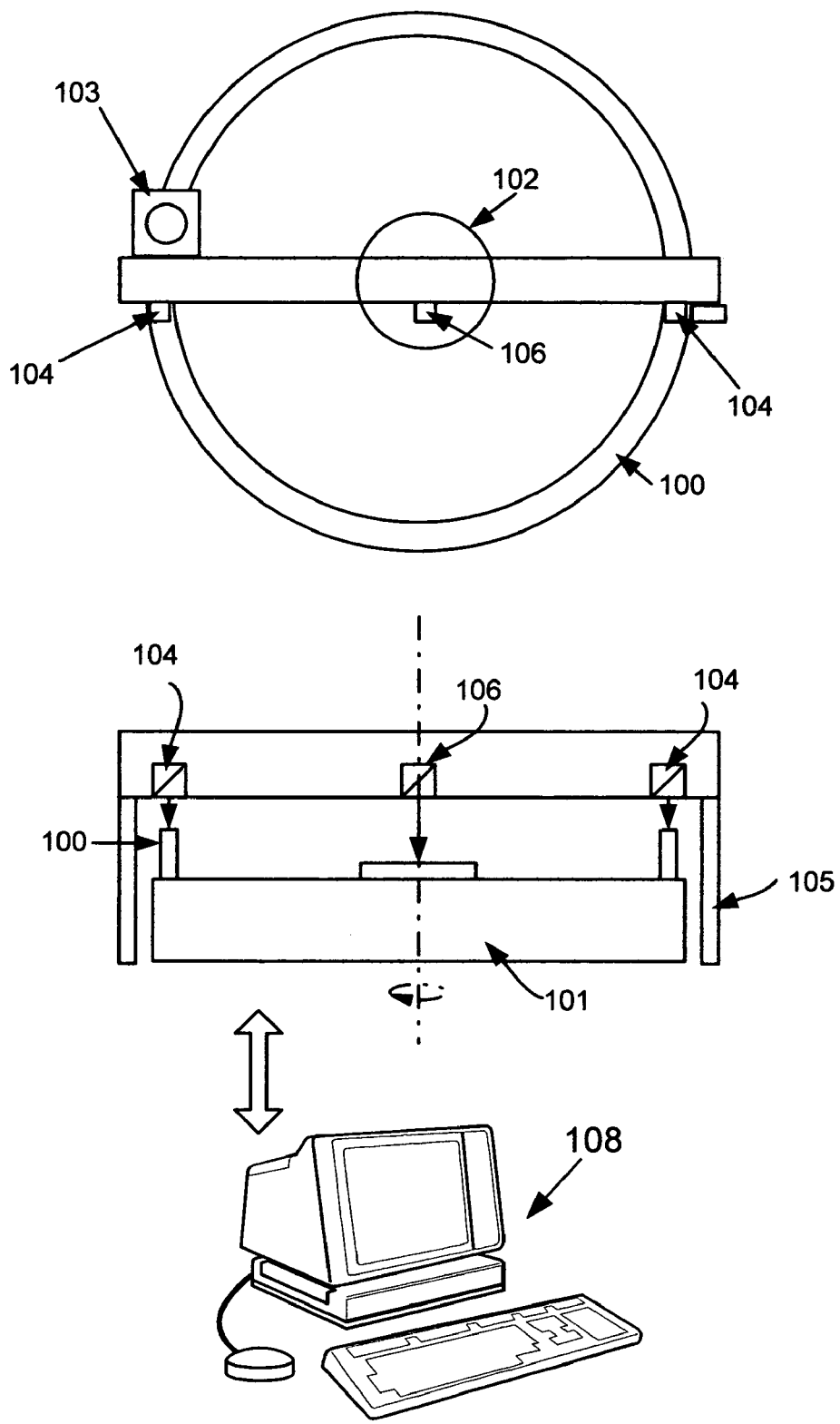
FIG. 2 shows diagrammatic elevational and top views of an embodiment of the invention along with a general purpose computer programmed to carry out data manipulation, reduction; control, and calculations.

The invention may best be understood by reference to a specific example, the measurement of the flatness of an annular surface on a ring. FIG. 2 shows apparatus that embodies the invention in this case. A ring 100 is mounted on a rotary table 101. A mechanical structure 105 spanning the rotary table 101 carries three indicators (104, 106) that measure displacement of the surface under test relative to the structure 105. Two of these indicators (104) measure motion of the ring 100, and indicator 106 measures a target on the axis of rotation of the rotary table 101. The indicators may be interferometric probes, plane mirror interferometers, capacitance gages, optical triangulation sensors, inductive probes, displacement interferometers, LVDTs, or any other appropriate gage. The structure 105 also carries a small aperture interferometer 103, preferably a Fizeau interferometer.

Figure 3A:
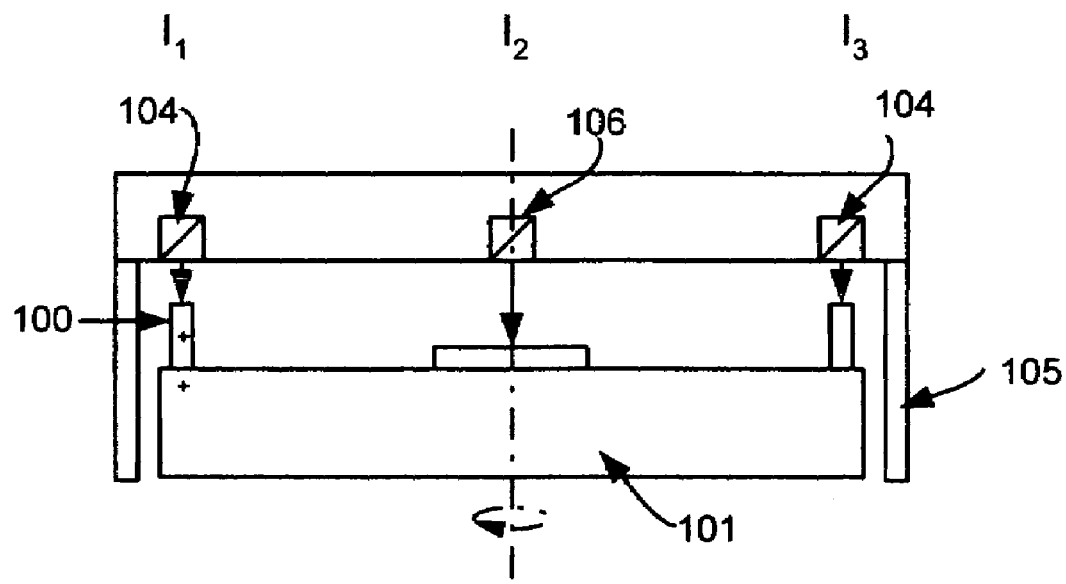
FIGS. 3A and 3B illustrate the reversal principle employed in the invention.
Figure 3B:
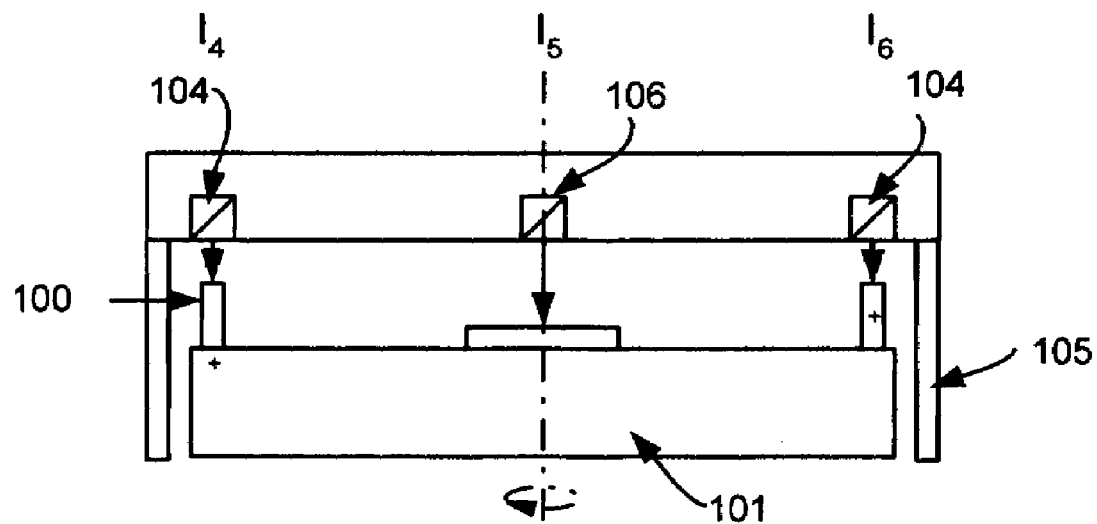

It will be immediately clear that, on rotation of the rotary table 101, the indicators (104) and the Fizeau interferometer record changes in both the part under test and error motions of the bearing in the rotary table 101. In this case, the errors of the part can be separated from the error motion of the bearing using Estler's well-known face motion reversal (described publicly by Estler in May 1987 but not published until 1996 (See Evans Chris J, Hocken R. J. and Estler W. T. "Self-calibration: reversal, redundancy, error separation, and "absolute testing"" CIRP Annals, Vol 45/2, 1996 pp 617–634)). This reversal (comprising two separate measurements) can be understood by reference to FIGS. 3A and 3B where, for convenience, the output of indicators (104, 106) has been designated $I_1$ through $I_6$. Marks (+) are shown on the part and the rotary table to indicate that the ring 100 is rotated by 180 degrees between Measurement 1 and Measurement 2. It should be obvious that $I_1$ and $I_4$, for example are outputs from the same indicator.

Let part errors (circular flatness) as a function of azimuthal position, $\theta$, be $P(\theta)$, spindle tilt errors, $T(\theta)$, spindle axial motion errors, $A(\theta)$, and the radius at which the measurements are made be r.

$$A(\theta)=I_2=I_5$$

and $$I_1=P(\theta)+A(\theta)+rT(\theta)$$

$$I_3=P(\theta+180)+A(\theta)-rT(\theta)$$

$$I_4=P(\theta+180)+A(\theta)+rT(\theta)$$

$$I_6=P(\theta)+A(\theta)-rT(\theta)$$

Hence, $$P(\theta) = \frac{1}{2}\left[\left(\frac{I_1 + I_6 - A(\theta)}{2}\right) + \left(\frac{I_3 + I_4 - A(\theta)}{2}\right)^{180}\right]$$

where the superscript 180 indicates that the data is rotated 180 degrees. Also, $$T(\theta) = \frac{I_1 - I_6}{2r} = \frac{I_4 - I_3}{2r}$$

Note that tilt of the part with respect to the axis of rotation produces a once per revolution change in the displacement recorded in the indicators 104 recoding motion of the part—and these signals will be 180 degrees out of phase. Hence, they are easily subtracted from the desired signals. Similarly, part tilt causes a once per revolution change in the tilt recorded by the small aperture interferometer 103, which can again easily be filtered out of the data using well-known procedures.

Figure 4:
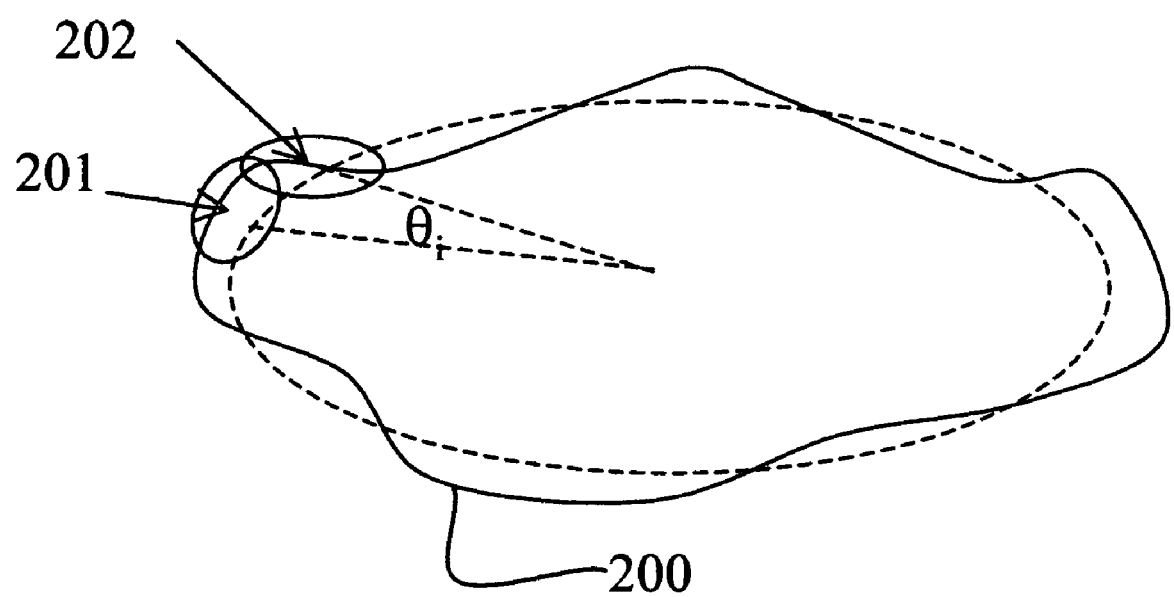
FIG. 4 is a diagrammatic illustration of a part profile measured via the invention.

The procedure above—using the outputs of the indicators (104, 106) produces a part profile (FIG. 4, 200) and the tilt of the bearing as a function of angle. Using this information at the specific angles ($\theta_i$), individual sub-apertures (e.g., 200, 201, etc) recorded by the small aperture interferometer 103 are adjusted in piston, tip and tilt to give area information on the variation of the part surface. Once having the individual sub-aperture profiles adjusted for their respective local piston, tip, and tilts, these local profiles can be used to construct the entire area of the part by plotting local profiles as a function of the location over which their measurements were made. Where overlaps occur, the overlapping data can be averaged, but no overlapping is required as with traditional stitching procedures. With this procedure, error propagation is eliminated in the local profile data because i is constrained by the prior knowledge gained in the use of reversals. In essence, the low spatial frequency measurement provides information about the orientation of the sub-apertures at which the high frequency measurements are made.

Figure 5:
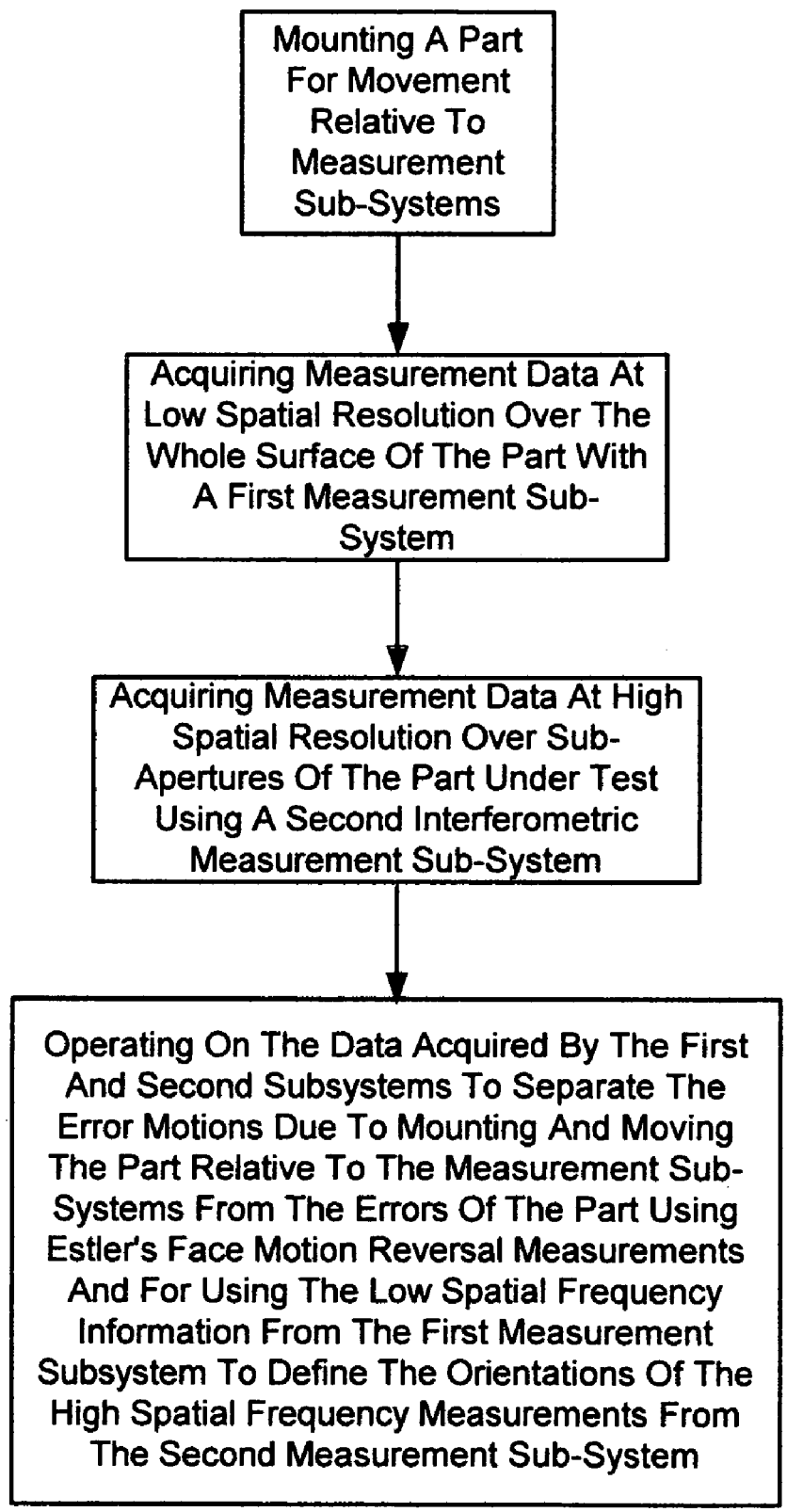
FIG. 5 is a high level flow chart of a method in accordance with the invention.

The various calculations, data reduction, motion control, interface, and general housekeeping functions discussed above may be carried out in a well-known manner through the use of a suitably programmed general purpose computer shown as 108 in FIG. 2, or its equivalent, such as a DSP. FIG. 5 provides a high-level flow chart of the methodology of the invention.

In this specific application, a cone error in the part under test produces an unvarying error component in the small aperture interferometer, comprising tilt plus higher order curvatures that are proportional to the cone error and the ratio of the part radius to interferometer aperture. The average of all the small aperture data sets contains:
- cone-induced errors;
- the average radial profile; and
- the error in the reference flat of the interferometer (also known as a transmission flat where the interferometer is a Fizeau).

Here the average radial profile refers to higher spatial frequencies than tilt, and can be filtered from the data. The reference flat of the interferometer can be calibrated by a number of well-known techniques (see for example Evans, et al. supra); and that calibration can be subtracted from the averaged data. It will be immediately apparent to those versed in the art that time dependent changes in the reference flat (e.g., caused by changing temperature) can be compensated for using a calibration artifact mounted on the rotary table.

Such a calibration artifact, mounted as the target (102), provides an alternative approach to measuring cone errors by moving the small aperture interferometer (103) along the so it can measure the target (102). Now, if the rotary table rotates, the lack of perpendicularity between the target and the axis of rotation causes tilt as a function of rotation. The target can be adjusted to minimize tilt variation—and then the interferometer is adjusted so that its reference (transmission) flat is parallel to the target. Now the interferometer can be moved into position to measure the ring; if the movement of the interferometer is free of pitch error, then the measured rotationally invariant tilt is associated with the part. Alternatively, the tilt as the interferometer is moved can be measured and the appropriate correction applied.

For example, the surface of stick mirrors (used for example on lithography stages) could be measured by stitching small aperture interferometer data along profiles derived by straightedge reversal.

Also, one could provide facility to move the indicators (104) and interferometer (103) to adapt the tool to various sized rings.

Having described the invention, variants will occur to those skilled in the art based on its teachings and it is intended that such variants be included within the scope

What is claimed is:

1. An interferometric measurement method for measuring the surface of a part, said method comprising the steps of:
   - mounting a part for movement relative to measurement sub-systems;
   - acquiring measurement data at low spatial resolution over the whole surface of the part with a first measurement sub-system;
   - acquiring measurement data at high spatial resolution over sub-apertures of the part under test using a second interferometric measurement sub-system; and
   - operating on the data acquired by said first and second measurement subsystems to separate the error motions due to mounting and moving the part relative to said measurement sub-systems from the errors of the part, use the low spatial frequency information from said first measurement subsystem to define the orientations of said high spatial frequency measurements from the second measurement sub-system, and provide a high resolution measurement of the entire surface of the part in the form of output data.

2. The interferometric measurement method of claim 1 further including orienting the part relative to said second interferometric sub-system as it is moved.

3. The interferometric measurement method of claim 1 wherein the part is mounted on a rotary table mounted for changing its angular orientation by predetermined angles, including 180 degrees, with respect to said first and second measurement sub-systems.

4. The interferometric measurement method of claim 3 in which said operations for separating part errors from rotary table errors comprises using Estler's face motion reversal measurements.

5. The interferometric measurement method of claim 3 further including a providing a reference artifact mounted on said rotary table for calibrating said second interferometric sub-system.

6. The interferometric measurement method of claim 5 wherein said second interferometric measurement sub-system is translated from observing said reference artifact to measuring the part under test.

7. The interferometric measurement method of claim 6 wherein angular error motions of second interferometric measurement sub-system as it is translated from observing said reference artifact to measuring the part under test is measured and the resulting data used to correct the final part measurement.

8. The interferometric measurement method of claim 1 in which said first measurement sub-system comprises displacement measuring interferometers.

9. The interferometric measurement method of claim 1 in which said second measurement sub-system comprises a Fizeau interferometer.

10. The interferometric measurement method of claim 1 in which said second measurement sub-system for high spatial frequencies is a Twyman-Green interferometer.

11. An interferometric measurement system for measuring the surface of a part, said system comprising:
   - a mechanical arrangement for mounting and moving a part relative to measurement sub-systems;
   - a first measurement sub-system for acquiring measurement data at low spatial resolution over the whole surface of the part;
   - a second interferometric measurement sub-system for acquiring measurement data at high spatial resolution over sub-apertures of the part under test; and
   - a device programmed for operating on the data acquired by said first and second subsystems to separate the error motions of said mechanical arrangement used for mounting and moving the part relative to said measurement sub-systems from the errors of the part and for using the low spatial frequency information from said first measurement subsystem to define the orientations of said high spatial frequency measurements from the second measurement sub-system.

12. The interferometric measurement system of claim 11 further including a mechanical manipulator to allow the part orientation to be changed with respect to said mechanical arrangement for mounting and moving the part relative to said second interferometric sub-system.

13. The interferometric measurement system of claim 11 in which said mechanical arrangement comprises a rotary table mounted on a rotary table for changing the part orientation with respect to said first and second measurement sub-systems by predetermined angles including 180 degrees.

14. The interferometric measurement system of claim 13 in which said device is programmed with Estler's face motion reversal measurement procedure for separating part errors from rotary table errors.

15. The interferometric measurement system of claim 13 further including a reference artifact mounted on said rotary table for calibrating said second interferometric sub-system.

16. The interferometric measurement system of claim 15 wherein said second interferometric measurement sub-system is arranged to be translated from observing said reference artifact to measuring the part under test.

17. The interferometric measurement system of claim 16 wherein angular error motions of second interferometric measurement sub-system as it is translated from observing said reference artifact to measuring the pad under test is measured and the resulting data used to correct the final part measurement.

18. The interferometric measurement system of claim 11 in which said first measurement sub-system comprises displacement measuring interferometers.

19. The interferometric measurement system of claim 11 in which said second measurement sub-system comprises a Fizeau interferometer.

20. The interferometric measurement system of claim 11 in which said second measurement sub-system for high spatial frequencies is a Twyman-Green interferometer.

* * * * *